United States Patent Office 3,686,112
Patented Aug. 22, 1972

3,686,112
PROCESS FOR POLYMERIZING ACRYLONITRILE
August Vrancken, 19 Telemachuslaan, Brussels 19, Belgium, and Cyrille Van Eygen, 8 Avenue Delleur, Brussels 17, Belgium
No Drawing. Filed Oct. 6, 1969, Ser. No. 864,164
Int. Cl. C08f 3/76, 45/144
U.S. Cl. 260—32.6 N 14 Claims

ABSTRACT OF THE DISCLOSURE

A continuous method for the polymerization of acrylonitrile to produce a spinnable solution of polyacrylonitrile comprising maintaining a polymerization system comprising monomeric acrylonitrile, a dialkylamide and polymeric acrylonitrile in a concentration of at least 25% by weight, the weight ratio of monomeric acrylonitrile to dialkylamide being maintained at at least 1.63:1. The reaction is conducted in the presence of a redox catalyst at a temperature between 40° and 70° C.

---

The present invention is directed to a method of polymerizing acrylonitrile, and more particularly, to a method of producing a spinnable solution of polyacrylonitrile in an organic solvent, the spinnable solution so produced, and fibers, filaments and films manufactured from said spinnable solution.

In view of the commercial importance of polyacrylic fibers in the textile field, a large number of processes have already been proposed for the preparation of spinning solutions.

In the earliest processes, some of which are still widely used industrially, the polyacrylonitrile was prepared by the polymerization of acrylonitrile in an aqueous suspension in the presence of redox catalysts. The polyacrylonitrile thus obtained was separated and then dissolved in an appropriate solvent so as to obtain a spinnable solution of polyacrylonitrile.

Another more recent technique consists in directly effecting the polymerization of acrylonitrile in the presence of the solvent used for spinning. Such a process constitutes an obvious simplification in economy and operation, as compared with processes of polymerization in an aqueous emulsion.

The processes applying this new technique have in common one or more of the following points:

(a) The acrylonitrile is copolymerized with compounds which are ethylenically unsaturated, such as acrylic and/or methacrylic esters, vinyl acetate, styrene or the like, and also with other comonomers intended to improve the tinctorial properties of the fibers and which are receptive to acid dyes (for example, vinyl-pyridine) or to basic dyes (for example, styrene-sulphonic acid, allyl- or methallyl-sulphonic acid or the like);

(b) The copolymerization is effected in the presence of solvents, the most important of which are concentrated aqueous solutions of zinc chloride or sodium sulphocyanide, or of organic solvents, such as dimethyl sulphoxide, dimethyl acetamide or dimethyl formamide;

(c) The copolymerization is effected in the presence of free radical-forming catalysts (azo compounds, organic and inorganic peroxides, persulphates, hydrogen peroxide or the like) or of the anionic type (organo-metallic derivatives of alkali metals, sodium cyanide, phosphines or the like);

(d) The molecular weight of the polyacrylonitrile may be regulated by chain regulators, such as ethyl-, t- butyl- or dodecylmercaptans, thiourea, dixanthegenate disulphide, thioglycollic acid or the like;

(e) The temperature of the polymerization reaction is within the range from −80 to +150° C. or even higher.

Depending on the monomer/solvent ratio in the reaction medium, the following classifications are made:

Polymerization in solution—when the amount of solvent is sufficient to dissolve the polyacrylonitrile formed in the course of the polymerization;

Polymerization in suspension—when this quantity of solvent is insufficient.

By way of example, when using dimethyl formamide as the solvent, the polymerization is effected in solution when the acrylonitrile/dimethyl formamide ratio is lower than 0.76:1 (in mols) or lower than 0.55:1 (by weight) and suspension operation is adopted when this ratio is higher than these two values.

Polymerization in solution has the disadvantage that the viscosity increases rapidly with the molecular weight and with the concentration of the polyacrylonitrile. For this reason, polymerization in solution is generally stopped when the concentration of polyacrylonitrile reaches at most 25% by weight. Another disadvantage, due to the low concentration of monomers, is the low speed of reaction, which necessitates a polymerization time of from 25 to 50 hours. Thus, for example, note German patent specification Nos. 1,052,687 and 1,163,027.

On the other hand, in suspension polymerization, in which the operation is carried out in the presence of a large quantity of monomer, the speed of polymerization is much higher, varying from a few minutes to a few hours. However, the risk of gelling of the polymerization medium is great. In this regard, the medium can gel even at a polymer concentration as low as 6%. Thus, for example, note U.S. Pat. 2,528,710.

However, if certain precautions are taken, it is possible to continue polymerization until about 20% by weight of polyacrylonitrile is obtained. Thus, for example, note U.S. Pat. 2,528,710, British Pat. 1,099,749, published Dutch Pat. application No. 6506295 and Belgian patent specification No. 666,121.

Polymerization in suspension is thus found to be more advantageous from the industrial point of view than polymerization in solution because output per hour of polymer per unit of volume of apparatus is much higher. Nevertheless, a disadvantage is that, as indicated above, it is not possible to exceed a concentration of about 20% by weight of polymer in the reaction medium because of the excessive increase of viscosity.

Attempts have been made to remedy this situation by various expedients. Thus, in Belgian patent specification No. 572,665, it is proposed to add from 4 to 20% of water in order to increase the percentage of conversion of acrylonitrile into polyacrylonitrile, while retaining a sufficiently low viscosity to permit the handling of the reaction medium obtained. The disadvantage of this method is that it is subsequently necessary to eliminate all of the water thus added, thereby entailing considerable problems with respect to distillation.

Also, it has been proposed to effect the polymerization in two stages, first a polymerization in suspension until about 20% of polymer is obtained and then polymerization in solution by adding an additional quantity of solvent (British patent specification No. 1,095,749 and published Dutch patent application No. 6506370). The disadvantage of this method is that it requires two different reactors, so that it is difficult to synchronize the two reactions and there is a risk of wider distribution of the molecular weights of the polymer that is obtained.

From the industrial point of view, it would, therefore, be advantageous to find a method of polymerizing acrylonitrile in suspension which retains the advantages inherent to this technique of a high speed of polymerization, yet would permit a rate of conversion of acrylonitrile into polyacrylonitrile considerably greater than 20% by weight, thereby improving the hourly production capacity of the installation in an easy and efficient manner.

Such a process has now been achieved in accordance with the present invention by which it has been found possible to polymerize acrylonitrile either alone or together with other copolymerizable monomers such that the polymer content is greater than 25% by weight, the viscosity of the reaction medium still being sufficiently low so as to permit easy handling. This is achieved through a continuous method comprising maintaining a polymerization system comprising monomeric acrylonitrile, a dialkylamide and polymeric acrylonitrile in a concentration of at least 25% by weight, maintained by the weight ratio of monomeric acrylonitrile to dialkylamide of at least 1.63:1. Such ratio is achieved by continuously adding to the reaction system a mixture containing from 72% to 95% acrylonitrile monomer and 5% to 28% dialkylamide.

Accordingly, it is a principle object of the present invention to provide a novel method for the production of polyacrylonitrile in a manner which eliminates the inherent deficiencies and disadvantages of previously utilized processes.

It is still a further object of the present invention to provide such a process for the production of a spinnable solution of polyacrylonitrile, such solution per se and fibers, filaments, and films manufactured therefrom wherein such process is conducted in a single stage and without the addition of additives generally employed in previously utilized processes.

It is yet a further object of the present invention to provide such a novel process for the polymerization of acrylonitrile wherein said process is carried out in a single stage and with a polyacrylonitrile content of at least 25% by weight, yet the viscosity of the reaction system remains sufficiently low so as to permit easy handling.

Still a further object of the novel process and product of the present invention relates to conducting such polymerization while maintaining a system comprising monomeric acrylonitrile, a dialkylamide, and polyacrylonitrile, the polyacrylonitrile being present in a concentration of at least 25% by weight, maintained as such by maintaining the weight ratio of monomeric acrylonitrile to dialkylamide at least 1.63:1 through the continuous introduction of a mixture comprising at least 72% acrylonitrile monomer and at most 28% dialkylamide.

Still further objects and advantages of the novel process and product of the present invention will become more apparent from the following more detailed description thereof.

It has now been found that by observing certain operational conditions, it is possible to bring the concentration of the polyacrylonitrile in the polymerization medium to values which are higher than 25% and which may even attain and exceed 40%, while obtaining a reaction medium the viscosity of which remains sufficiently low to permit easy handling.

The present invention relates to a continuous method for the production of a spinnable solution of polyacrylonitrile by polymerization in suspension in a mixer-reactor and in one stage, in which the reaction medium comprises a dialkylamide solvent, monomeric acrylonitrile, polymeric acrylonitrile and a polymerization catalyst, the method being characterized in that:

(a) a concentration of at least 25% by weight of polymeric acrylonitrile is maintained in the reaction medium by maintaining therein a weight ratio between monomeric acrylonitrile and dialkylamide of at least 1.63:1 by continuously adding a mixture containing at least 72% by weight of monomeric acrylonitrile and at most 28% by weight of dialkylamide;

(b) a polymerization catalyst is used which comprises an oxidizing agent, which is preferably inorganic, and an organic reducing agent;

(c) the temperature of the reaction medium is kept between 40 and 70° C.;

(d) a residence time of the reaction medium in the mixer-reactor of from a few minutes to several hours is maintained;

(e) a portion of the reaction medium is continuously withdrawn and there is added thereto an appropriate amount of dialkylamide to ensure that, after elimination of non-polymerized acrylonitrile, a spinnable solution of polyacrylonitrile is obtained.

As used hereinbelow, the expression polyacrylonitrile is to be understood to mean not only the homopolymer of acrylonitrile but also copolymers containing at least 85% by weight of acrylonitrile, 0 to 10% by weight of another ethylenically unsaturated comonomer and 0 to 5% by weight of an ethylenically unsaturated comonomer for improving the tinctorial properties.

The ethylenically unsaturated comonomer used in an amount of from 0 to 10% by weight, referred to the total amount of copolymer, may be a vinyl compound, such as vinyl acetate or styrene, but is preferably an alkyl ester of acrylic or methacrylic acid, such as methyl, ethyl, propyl, isopropyl, butyl, isobutyl, hexyl or 2-ethylhexyl, acrylate or methacrylate or the like.

The ethylenically unsaturated comonomer which improves the tinctorial properties and is used in an amount of 0 to 5%, referred to the total amount of copolymer, is, for example, vinyl-sulphonic acid, allyl-sulphonic acid, methallyl-sulphonic acid, p-styrene-sulphonic acid, vinyl-phenyl-ether-p-sulphonic acid, N-phenyl-maleamic-p-sulphonic acid or N-phenyl-maleimide-p-sulphonic acid or the alkali metal, ammonium or amine salts of these acids.

The dialkylamide solvent employed in the process of the present invention preferably comprises a dilower alkyl amide of a lower monocarboxylic acid. Suitable examples of such solvents include:

dimethyl formamide
diethyl formamide
diisopropyl formamide
di-t-butyl formamide
dimethyl acetamide
diethyl acetamide
di-t-butyl acetamide
dimethyl propionamide etc.

Preferred dialkylamides in accordance with the present invention are dimethyl formamide and dimethyl acetamide.

For the purpose of carrying out the process according to the present invention, it is essential that the acrylonitrile-dialkylamide ratio by weight in the reaction medium should be at least 1.63:1. When this ratio is lower than this critical value, it becomes impossible to maintain, in the reaction medium, a concentration of dry matter greater than 20% by weight, without the viscosity at the same time increasing excessively. With regard to this upper limit of this ratio, it is dictated solely by the minimum amount of dialkylamide necessary for maintaining the catalyst in solution. Under practcial conditions, this minimum quantity is 5% by weight, i.e., an acrylonitrile/dialkylamide weight ratio of about 15:1 in the reaction medium (taking into account the polyacrylonitrile contained in this medium).

In order to keep the acrylonitrile/dialkylamide weight ratio higher than 1.63:1, a mixture containing at least 72% by weight of monomeric acrylonitrile and at most 28% by weight of dialkylamide is added continuously to the reaction medium, this mixture containing at most 95% of acrylonitrile and at least 5% of dialkylamide. Instead of adding the acrylonitrile and dialkylamide in the form of a mixture, these two substances may also be added separately to the reaction medium, in the ratio indicated above.

With regard to the catalyst, the latter comprises an oxidizing agent, which is preferably inorganic, and an organic reducing agent. In principle, the oxidizing agent can be an organic substance, for example, a peroxy compound, such as benzoyl peroxide, a hydroperoxy compound, such as cumene hydroperoxide, or an azo compound, such as azo-bis-isobutyronitrile, but for economic reasons preference is given to inorganic oxidizing agents, such as hydrogen peroxide, sodium perborate, sodium perchlorate and in particular, ammonium persulphate. The inorganic reducing agents conventionally used in redox systems in aqueous suspension cannot be used in a reaction medium composed of acrylonitrile and dialkylamide because they are not soluble therein. For this reason, according to the present invention the reducing agent is an organic compound, such as a mercaptan, for example ethyl mercaptan, t-butyl mercaptan, dodecyl mercaptan or other organosulphur compounds, such as thiourea, dixanthogenate disulphide, thioglycolic acid or the like. Mercaptans are preferred because they are largely recoverable on separation of the monomers from the effluent of the mixer-reactor and are recycled to the latter at the same time as these monomers. In the method according to the present invention, the oxidizing agent/reducing agent molar ratio in the catalyst is from 5.0:1 to 0.05:1, preferably from 1.0:2 to 0.2:1. In addition, the amount of catalyst (oxidizing agent+reducing agent) in relation to the reaction medium is generally between 0.01 and 2% by weight.

The temperature of the reaction system in the course of the polymerization process according to the present invention is maintained between about 40° C. and about 70° C. When the temperature is lower than 40° C., the speed of polymerization becomes very low and the residence times in the mixer-reactor are lengthened accordingly. On the other hand, when the temperature is higher than about 70° C., the latter becomes too close to the second order transition temperature (which is between 80 and 100° C.), the apparent solubility of the polymer increases and swelling of the polymer by the solvent is observed, at the same time as a considerable increase in viscosity.

Other conditions remaining unchanged, the residence time of the reaction medium in the mixer-reactor is dependent on the content of dialkylamide in the reaction medium and the polymer concentration which it is desired to obtain. With an increase of the dialkylamide content, the residence time increases and the higher the desired concentration of polymer the longer this residence time will be. Thus, in order to obtain 30% of polymer in a reaction medium which contains 5% of diakylamide, a residence time of from 15 to 30 minutes is required. In order to obtain 40% of polymer in a reaction medium which contains 20% of dialkylamide, a residence time of from 90 to 120 minutes is required. Generally, a residence time of a few minutes to several hours is required.

The process of the present invention is advantageously carried out in equipment comprising a reaction vessel equipped with heating and cooling means, a mechanical agitator, storage reservoirs with metering pumps for continuous or intermittent introduction of the constituents of the reaction medium, optionally a tube for introducing an inert gas, such as nitrogen, and a means of continuous removal of contents, for example a pump, in order to maintain a substantially constant volume of reaction medium. The effluent of the reactor is delivered to a dilution tank in order to receive therein an additional quantity of dialkylamide and thus to obtain a solution containing 15–20% by weight of dry material. This solution is continuously fed to a rectifier, into which there is introduced dialkylamide vapor which entrains, in the form of a distillate, the monomers which have not been polymerized together with the major portion of the reducing agent and dialkylamide, this distillate being returned to the reactor after correction of its concentration of monomers and reducing agent by adding fresh materials, while the residue withdrawn from this rectification consists of a polyacrylonitrile solution having a concentration of from 15 to 20% by weight, which is delivered to a concentrator, for example a dropping film evaporator, in order to bring the concentration of the polyacrylonitrile to the spinning concentration, which is generally from 23 to 27% by weight of polyacrylonitrile. Since, as a rule, the rectifier and the concentrator operate under reduced pressure, perfect degasification of the spinning solution is simultaneously achieved, so that this solution can be delivered directly to the spinnerets or to a storage tank preceding the latter. The spinning solution thus obtained has a monomer content of less than 0.1% by weight.

According to the process of the present invention, it is, therefore, possible in practical manner to double the polyacrylonitrile content of the reaction medium, while imparting to the latter a sufficiently low viscosity to enable it to be easily handled until it is converted into a spinnable solution. It will be noted that, in contrast to the previously known processes, this increase of the polyacrylonitrile content in the reaction medium is obtained in a single stage or without having to add a diluent, such as water, in order to lower the viscosity, this diluent having to be completely eliminated subsequently and at great expense.

The following examples are given for the purpose of illustrating the present invention. In these examples, the molecular weight of the polymers is calculated from the intrinsic viscosity in solution in dimethyl formamide at 25° C. in accordance with the equation:

$$[\eta]_{ml./g.} = 0.00283 \mu$$

EXAMPLE 1

A 2-liter glass reactor provided with a double wall for thermostatic control, a cage-shaped agitator, a thermometer, a level indicator and inlet and outlet connections for a current of nitrogen, was continuously fed with the mixture described hereinafter. The polymer suspension formed was withdrawn at such a rate that the volume of the stationary phase remained constant at 1.4 liters. The temperature inside the reactor was kept at 60° C.

Feeding was effected by means of three metering pumps which, respectively, introduced per hour:

(a) A mixture of 661 g. of acrylonitrile, 36 g. of methyl acrylate and 3.23 g. of n-dodecanethiol;

(b) A mixture of 129 g. of dimethyl formamide and 0.912 g. of ammonium persulphate; and (c) A mixture of 5.3 g. of sodium methallyl sulphonate in about 10 ml. of water.

The residence time, i.e., the time for the renewal of the contents of the reactor, was 84 minutes. After 4 cycles of 84 minutes, equilibrium was reached and the stationary phase was found to contain 32% by weight of polymer. The monomer/solvent ratio in the stationary phase was 3.5:1 and the conversion, referred to monomer, was 38%. The polymer had a molecular weight of 51,000 and it contained 100 milliequivalents of $NaSO_3$ groups per kg. of polymer.

At the outlet of the reactor, the suspension was diluted with dimethyl formamide in order to lower the content of dry materials to between 15 and 20% and it is introduced into one of the top trays of a stripping column operating under a vacuum. Vaporized dimethyl formamide was introduced into one of the bottom trays and the monomers which had not reacted were recovered in a condenser. The polymer was dissolved when passing through the column and was withdrawn at the bottom tray in the form of a syrup containing from 15 to 20% of polymer and less than 1% of residual monomers. The syrup was concentrated to between 23 and 30% of dry material in order to obtain the viscosity required for spinning, by passing through a thin layer evaporation apparatus. The monomers recovered were returned to the reactor.

EXAMPLE 2

Following the procedure of Example 1, a reactor was fed with a mixture of 661 g. of acrylonitrile, 36 g. of methyl acrylate, 129 g. of dimethyl formamide, 5.3 g. of sodium methallyl-sulphonate, 0.684 g. of ammonium persulphate and 2 g. of dodecanethiol per hour. The residence time was 120 minutes and the volume of the reactor was 2 liters. 41% of polymer was obtained in the suspension withdrawn, so that the stationary phase contained a monomer/solvent ratio equal to 2.7:1. The molecular weight of the polymer was 81,000 and the content of $NaSO_3$ groups was 82 milliequivalents per kg. The yield, referred to monomers, was 49%. This example shows that it is possible for the polymer content to be practically doubled in relation to the previously known processes. In addition, this polymer content of 41% does not constitute the upper limit.

EXAMPLE 3

A process was carried out as in Example 2 but the residence time was reduced to 60 minutes so that there was only a stationary volume of 1 liter and the stationary phase contained 25% of polymer. The polymer had a molecular weight of 53,000 and contained 106 milliequivalents of $NaSO_3$ per kg. of resin. The stationary phase had a monomer/solvent ratio of 3.7:1. The yield, referred to monomer, was 30%. This example shows that, by reducing the residence time, the polymer content of the reaction medium is automatically reduced somewhat.

EXAMPLE 4

The reactor was fed under the same conditions as in Example 3 but omitting the dodecanethiol. After 55 minutes, the reactor was clogged because of the gelling of the contents. The polymer content was, however, less than 10%. The polymer had a molecular weight of 141,300.

EXAMPLE 5

In this example, the critical minimum acrylonitrile/solvent ratio of at least 1.63:1 was not maintained and the reactor was fed with a mixture containing 50% by weight of acrylonitrile, 3% of methyl acrylate, 47% of dimethyl formamide and about 0.14% of ammonium persulphate. The contents of the reactor were blocked when the amount of polymer reached 9%. The polymer had a molecular weight of about 50,000.

EXAMPLE 6

In this example, polymerization was started with a monomer/solvent ratio higher than 1.63:1 according to the present invention but, as the polymerization progressed, this ratio was reduced until it fell below 1.63:1, when it gave rise to gelling.

The reactor was fed with a mixture of 565.5 g. of acrylonitrile, 28.4 g. of methyl acrylate, 250 g. of dimethylformamide, 2.84 g. of sodium methallyl-sulphonate, 0.684 g. of ammonium persulphate and 1.78 g. of lauryl mercaptan per hour. The stationary volume was kept at 1 liter and the temperature at 60° C. Polymerization started normally but the contents of the reactor started to become viscous from the moment when there was 16% of polymer. At this moment, the monomer/dimethyl-formamide ratio was equal to 1.85:1. Shortly afterwards, as the concentration of polymer increased still further, the monomer/dimethyl-formamide ratio approached 1.63:1 and the reactor was blocked. The polmer contained 112 milliequivalents of $NaSO_3$ per kg. of resin.

EXAMPLE 7

This example describes the production of a polyacrylonitrile fiber.

A 5-liter reactor, heated to between 55 and 60° C. was fed with a mixture of 2644 g. of acrylonitrile, 144 g. of methyl acrylate, 516 g. of dimethyl formamide, 23.2 g. of ammonium methallyl sulphonate, 3.65 g. of ammonium persulphate and 7.92 g. of t-butyl mercaptan per hour. The polymer suspension was withdrawn from the reactor at such a rate as to maintain a residence time of 75 minutes. The polymer content in the reactor rose to 31.7%. The molecular weight was about 65,000 and the content of $NH_4SO_3$ was about 100 milliequivalents per kg. of resin. The monomers were recovered in the manner described in Example 1 and the syrup was concentrated to an appropriate viscosity in a thin layer evaporation apparatus. Spinning resulted in the formation of white fibers which were easily dyed by basic dyestuffs and which had the following properties:

Titer: 2.8 dtex before and 3.0 dtex after relaxation.
Tensile strength: 29.7 g./tex before and 27 g./tex after relaxation.
Tensile elongation: 27% before and 31% after relaxation.
Loop strength: 8.4 g./tex before and 11 g./tex after relaxation.
Loop elongation: 4% before and 8% after relaxation.

EXAMPLE 8

This example shows the influence of temperature.

Polymerization carried out under the conditions described in Example 3 but working at 70° C. instead of at 60° C. and using half the amount of catalyst, produced an increase in viscosity when the polymer content in the reactor reached 10%. At that moment, the reaction was very violent and difficult to control. Polymerization had to be stopped at a polymer content of 12% in the stationary phase.

EXAMPLE 9

This example shows that the reaction is no longer controllable above a certain temperature.

Repetition of Example 8 at 80° C. with a quarter of the amount of catalyst likewise led to difficulties. The reaction was stopped before 10% of polymer was obtained in the stationary phase.

EXAMPLE 10

This example shows that it is possible to operate at a lower temperature but with greater consumption of catalyst.

Example 2 was repeated at 50° C. with three times the amount of persulphate. The reaction took place normally and lasted 12 hours. The stationary phase contained 31% by weight of polymer. The polymer contained 110 milliequivalents of $NaSO_3$ groups per kg. and had a molecular weight of 70,000.

EXAMPLE 11

In this example, methyl methacrylate is used as the comonomer.

A reactor heated to 60° C. was fed with a mixture of 677 g. of acrylonitrile, 16.7 g. of methyl methacrylate, 129 g. of dimethyl formamide, 5.3 g. of sodium methallyl-sulphonate in 10 g. of water, 0.912 g. of ammonium persulphate and 3.23 g. of n-dodecyl mercaptan per hour. The residence time was 96 minutes. The suspension withdrawn 8 hours later contained 36.2% of polymer. The polymer had a molecular weight of 45,000 and contained 115 milliequivalents of $NaSO_3$ groups per kg. of copolymer.

EXAMPLE 12

The procedure of Example 1 is repeated except that the monomeric system is replaced by the following:

(a) 100% by weight acrylonitrile;
(b) 95% acrylonitrile, 5% vinyl acetate;
(c) 97% acrylonitrile, 3% vinyl sulphonic acid;

(d) 92% acrylonitrile, 5% styrene, 3% sodium salt of vinyl-phenyl-ether-p-sulphonic acid.

In all cases a similar reaction is seen to occur, evidencing the effectiveness of the instant process.

What is claimed is:

1. A continuous method for the production of a spinnable solution of polyacrylonitrile comprising suspension polymerizing acrylonitrile in a reaction medium comprising a dialkylamide, monomeric acrylonitrile, polymeric acrylonitrile and a polymerization catalyst in a mixer-reactor, wherein:
   (a) a concentration of at least 25%, by weight of polymeric acrylonitrile is constantly maintained in the reaction medium by maintaining therein a weight ratio of monomeric acrylonitrile to dialkylamide of at least 1.63:1 through the continuous addition of a mixture containing at least 72% by weight of monomeric acrylonitrile and at most 28% by weight of dialkylamide;
   (b) the dialkylamide is selected from dimethyl formamide, diethyl formamide, diisopropyl formamide, di-t-butyl formamide, dimethyl acetamide, diethyl acetamide, di-t-butyl acetamide, and dimethyl propionamide;
   (c) the temperature of the reaction medium is maintained between 40 and 70° C.;
   (d) the residence time of the reaction in the mixer reactor varies from a few minutes to several hours;
   (e) the polymerization catalyst comprises an oxidizing agent and an organic reducing agent wherein the catalyst is present in an amount of from 0.01 to 2% by weight based on the weight of the reaction medium, wherein said oxidizing agent and reducing agent are present in an oxidizing agent/reducing agent mole ratio from 5.0:1 to 0.5:1 and wherein said reducing agent is ethyl mercaptan, t-butyl mercaptan, dodecyl mercaptan, thiourea, dixanthogenate disulphide or thioglycolic acid; and
   (f) a portion of the reaction medium is continuously withdrawn and an appropriate quantity of dialkylamide added thereto so that, after elimination of unpolymerized acrylonitrile, a spinnable solution of polyacrylonitrile is obtained.

2. The method of claim 1, wherein said polymeric acrylonitrile is an acrylonitrile homopolymer.

3. The method of claim 1, wherein said polymeric acrylonitrile is a copolymer containing, by weight, at least 85% of acrylonitrile, from 0 to 10% of an ethylenically unsaturated comonomer and from 0 to 5% of an ethylenically unsaturated comonomer capable of improving the tinctorial properties.

4. The method of claim 3, wherein said ethylenically unsaturated comonomer employed in an amount of from 0 to 10% by weight, based on the weight of the copolymer, is vinyl acetate, styrene, an alkyl ester of acrylic acid or an alkyl ester of methacrylic acid.

5. The method of claim 3 wherein said ethylenically unsaturated comonomer capable of improving the tinctorial properties employed in an amount of from 0 to 5%, based on the total weight of the copolymer, is vinyl-sulphonic acid, allyl-sulphonic acid, methallyl-sulphonic acid, p-styrene-sulphonic acid, vinylphenyl-ether-p-sulphonic acid, N- phenyl-maleamic-p-sulphonic acid, N-phenyl-maleimide-p-sulphonic or an alkali metal, ammonium or amine salt thereof.

6. A method of claim 1 wherein the dialkylamide is dimethyl formamide or dimethyl acetamide.

7. A method of claim 1 wherein said oxidizing agent is an inorganic compound.

8. The method of claim 7 wherein said oxidizing agent is hydrogen peroxide, sodium perborate, sodium perchlorate or ammonium persulphate.

9. The method according to claim 1 wherein the oxidizing agent/reducing agent mole ratio in the catalyst is from 1.0:1 to 0.2:1.

10. The method according to claim 8 wherein said oxidizing agent/reducing agent mole ratio in the catalyst is from 1.0:1 to 0.2:1.

11. The method of claim 10, wherein said polymeric acrylonitrile is an acrylonitrile homopolymer.

12. The method of claim 10, wherein said polymeric acrylonitrile is a copolymer containing, by weight, at least 85% of acrylonitrile, from 0 to 10% of an ethylenically unsaturated comonomer and from 0 to 5% of an ethylenically unsaturated comonomer capable of improving the tinctorial properties.

13. The method of claim 12, wherein said ethylenically unsaturated comonomer employed in an amount of from 0 to 10% by weight, based on the weight of the copolymer, is vinyl acetate, styrene, an alkyl ester of acrylic acid or an alkyl ester of methacrylic acid.

14. The method of claim 12 wherein said ethylenically unsaturated comonomer capable of improving the tinctorial properties employed in an amount of from 0 to 5%, based on the total weight of the copolymer, is vinyl-sulphonic acid, allyl-sulphonic acid, methallyl-sulphonic acid, p-styrene-sulphonic acid, vinyl-phenyl-ether-p-sulphonic acid, N-phenyl-maleamic-p-sulphonic acid, N-phenyl-maleimide-p-sulphonic acid, or an alkali metal, ammonium, or amine salt thereof.

References Cited
UNITED STATES PATENTS

| | | | |
|---|---|---|---|
| 3,328,333 | 6/1967 | Dannelly et al. | 260—30.4 |
| 3,379,670 | 4/1968 | Corradi et al. | 260—32.6 |

OTHER REFERENCES

Billmeyer, Textbook of Polymer Science 1963, pp. 341–342.

MORRIS LIEBMAN, Primary Examiner

R. ZAITLEN, Assistant Examiner

U.S. Cl. X.R.

260—85.5 N, 88.7 R